United States Patent
Taylor et al.

[11] Patent Number: 5,386,256
[45] Date of Patent: Jan. 31, 1995

[54] PRINTER MODULE FOR RECORDING A DIGITAL SOUNDTRACK

[75] Inventors: Jeffrey E. Taylor, Chatsworth; Lane R. Stewart, La Poente; Thomas Tate, Valverde; Richard Weisman, Hollywood; Dana Wood, Los Angeles; LeRoy H. Reese, Burbank, all of Calif.

[73] Assignee: Sony Dynamic Digital Sound, Inc., Culver City, Calif.

[21] Appl. No.: 54,765

[22] Filed: Apr. 28, 1993

[51] Int. Cl.⁶ .................. G03B 31/02; G03B 27/32; G03B 27/08
[52] U.S. Cl. ..................... 352/27; 355/31; 355/98
[58] Field of Search ............... 352/27, 224, 226, 229; 355/31, 98; 292/63, 163, 169, 165, 140, 341.17, 340; 74/527

[56] References Cited

U.S. PATENT DOCUMENTS

| | | | |
|---|---|---|---|
| 1,194,637 | 8/1916 | Joy | 292/341.11 |
| 1,668,856 | 5/1928 | MacKenzie | 355/98 |
| 2,045,549 | 6/1936 | Freedman et al. | 355/98 |
| 2,098,371 | 11/1937 | Bedford | 355/98 |
| 2,235,907 | 3/1941 | Tondreau | 355/98 |
| 3,547,536 | 12/1970 | Phleps et al. | 352/229 |
| 3,856,414 | 12/1974 | Menary | 356/200 |
| 3,964,826 | 6/1976 | Joseph et al. | 352/10 |
| 4,029,409 | 6/1977 | Stutz | 352/6 |
| 4,306,781 | 12/1981 | Mosely | 352/37 |
| 4,461,552 | 7/1984 | Levine | 352/27 |
| 4,600,280 | 7/1986 | Clark | 352/37 |
| 4,620,266 | 10/1986 | Baumann et al. | 362/32 |

FOREIGN PATENT DOCUMENTS

WO92/14239 8/1992 WIPO.

OTHER PUBLICATIONS

"Dolby Stereo SR-D"; Dolby Laboratories Inc., San Francisco, Calif., 1991 (no month), Primary Examiner—Michael L. Gellner
Assistant Examiner—Eddie C. Lee
Attorney, Agent, or Firm—Pasquale Musacchio; Jerry A. Miller

[57] ABSTRACT

An add-on module for a contact printer used to manufacture a motion picture. The module enables the printing of a digital optical soundtrack on motion picture film from a sound negative using a standard contact printing process. The module includes spaced apart guide rollers and a main roller. Unexposed film is placed in contact between the main roller and the sound negative. The module further includes a fiber optic light source positioned adjacent to the sound negative for exposing the film and forming the digital soundtrack. The digital soundtrack is formed on a portion of the positive print which includes an area between each of the sprocket holes. In addition, the digital soundtrack extends from each sprocket hole to the edge of the positive print on both sides of the print.

15 Claims, 7 Drawing Sheets

PRINTER MODULE FOR RECORDING A DIGITAL SOUNDTRACK

FIELD OF THE INVENTION

This invention relates to a module for recording a digital optical soundtrack for a motion picture and more particularly, to a module for a contact printer that enables a recording of a positive digital optical soundtrack from a sound negative.

BACKGROUND OF THE INVENTION

Many techniques have been utilized to provide a soundtrack for a motion picture. One technique uses a magnetic medium similar to that used for magnetic recording tape. A soundtrack is then formed by applying the magnetic medium onto a motion picture filmstrip. However, this technique has disadvantages. A disadvantage is that the recording medium does not adhere well to the filmstrip. This results in a relatively short film life. In addition, the recording medium typically used is abrasive, which erodes and degrades the magnetic playback head, thus rendering it inoperable.

Another technique includes the formation of an analog optical sound recording on the filmstrip. One such recording is known as a variable area recording. This type of recording provides a soundtrack having optically translucent or opaque areas whose width varies according to the instantaneous amplitude of the sound. During movie projection, the soundtrack is illuminated from behind by a lamp and is viewed in front through a slit by a photocell. As the filmstrip advances, the photocell receives an amount of light that varies in accordance with the varying width of the varying translucent or opaque areas of the soundtrack. The photocell produces a corresponding voltage which is then utilized to reproduce the sound. However, this type of soundtrack also has disadvantages. A disadvantage is that the characteristics of the translucent or opaque areas may change due to factors such as contaminants or surface scratches on the filmstrip resulting in noise or other sound degradation.

In another type of optical recording, a soundtrack is configured such that it conforms to a curve that is empirically derived to provide the best compromise between signal to noise ratio, dynamic range and frequency response. This type of soundtrack is known in the art as the "Academy" soundtrack. As is well known, however, the Academy soundtrack has disadvantages since it is only monophonic, has a relatively low signal to noise ratio and relatively high distortion.

Digital optical recordings have also been used to provide a soundtrack. Generally, such recordings are formed by converting analog sound signals to digital sound signals. A filmstrip is then exposed to light which is modulated in accordance with the digital sound signals to form a digital soundtrack on the filmstrip. Digital soundtracks have many advantages. One advantage is increased resistance to audible degradation caused by repeated use. In addition, digital soundtracks substantially reduce the amount of hiss and noise associated with analog soundtracks. As such, an increasing number of motion pictures include a digital optical soundtrack.

However, many movie theaters are not equipped to reproduce a digital optical soundtrack. Consequently, it is desirable to provide a motion picture having a standard analog optical soundtrack and a digital optical soundtrack. This would insure compatibility with theaters having either analog or digital sound reproduction systems. In this regard, reference is made to U.S. Pat. No. 4,306,781 entitled MULTI-CHANNEL SOUND AND DATA SYSTEM which issued on Dec. 22, 1981 to Mosely. This patent discloses a multi purpose sound-/data system for motion picture film. As described therein, this system is capable of recording and reproducing digital and/or analog data such that there is no interference between different information channels.

U.S. Pat. No. 4,600,280 entitled DIGITAL AUDIO RECORDING/PLAYBACK SYSTEM FOR MOTION PICTURE FILM which issued to Clark on Jul. 15, 1986 describes a configuration for a filmstrip having digital and analog soundtracks. In this configuration, the filmstrip includes a three channel digital soundtrack extending along the length of filmstrip between the right sprocket holes and the picture frames. In addition, the film strip includes two conventional variable area soundtracks positioned between the left sprocket holes and the picture frames.

In addition, PCT Application WO 92/14239, entitled STORAGE MEDIUM AND APPARATUS AND METHOD FOR RECOVERING INFORMATION FROM SUCH MEDIUM BY OVERSAMPLING published Aug. 20, 1992 describes an alternate configuration for a filmstrip having analog and digital soundtracks. This application describes a filmstrip having two conventional analog stereo variable area soundtracks which are positioned in conventional locations on the film strip. In this application, however, a digital soundtrack is positioned between the sprocket hole perforations on both sides of the film strip. Alternatively, a digital soundtrack may be positioned on the edges of the film. Furthermore, the digital soundtrack may include both the area between the perforations and the edges of the film strip.

A motion picture may be manufactured by utilizing a contact printing process in a manner well known in the art. In this process, a sound negative having a negative analog optical soundtrack and a picture negative are processed by a contact printer to form a positive print. The addition of a negative digital optical soundtrack to a sound negative having a negative analog optical soundtrack is well known in the art. Standard contact printers have been modified in order to utilize such sound negatives to form digital and analog soundtracks on a filmstrip. In this regard, reference is made to an article entitled DOLBY STEREO SR-D published by Dolby Laboratories Inc. in 1991. This article generally discloses the addition of a mechanical assembly to a laboratory printer that enables the printing of a digital optical soundtrack on a positive print without using special print film.

However, it is known in the art that this mechanical assembly is complex because of its location on the printer. As such, the mechanical assembly is difficult to use and expensive to fabricate. In addition, the mechanical assembly utilizes sprockets for advancing the print film and the sound negative. It is known that sprockets cause damage on portions of the print film and sound negative that are located adjacent to the sprocket holes. Such damage may prevent a substantial portion of a soundtrack adjacent to the sprocket holes from being correctly formed on the print film and accurately read by sound reproducing equipment. Therefore, there is a need in the art for a mechanical assembly for a contact printer that enables the printing of a digital optical soundtrack that is inexpensive to fabricate, relatively easy to use and causes negligible wear of the print film and sound negative.

SUMMARY OF THE INVENTION

A module for a contact printer used to manufacture a motion picture, wherein a sound master having an image representing a digital optical soundtrack is placed in contact with motion picture film. The module includes a baseplate affixed to the contact printer and first and second guide rollers which are rotatably mounted to the baseplate. The module further includes a main roller rotatably mounted to the baseplate between the first and second guide rollers, wherein the film contacts the main roller and the sound master contacts the first and second guide rollers. In addition, the module includes exposing means for exposing the film to light through the sound master.

DETAILED DESCRIPTION OF THE INVENTION

Figure 1:
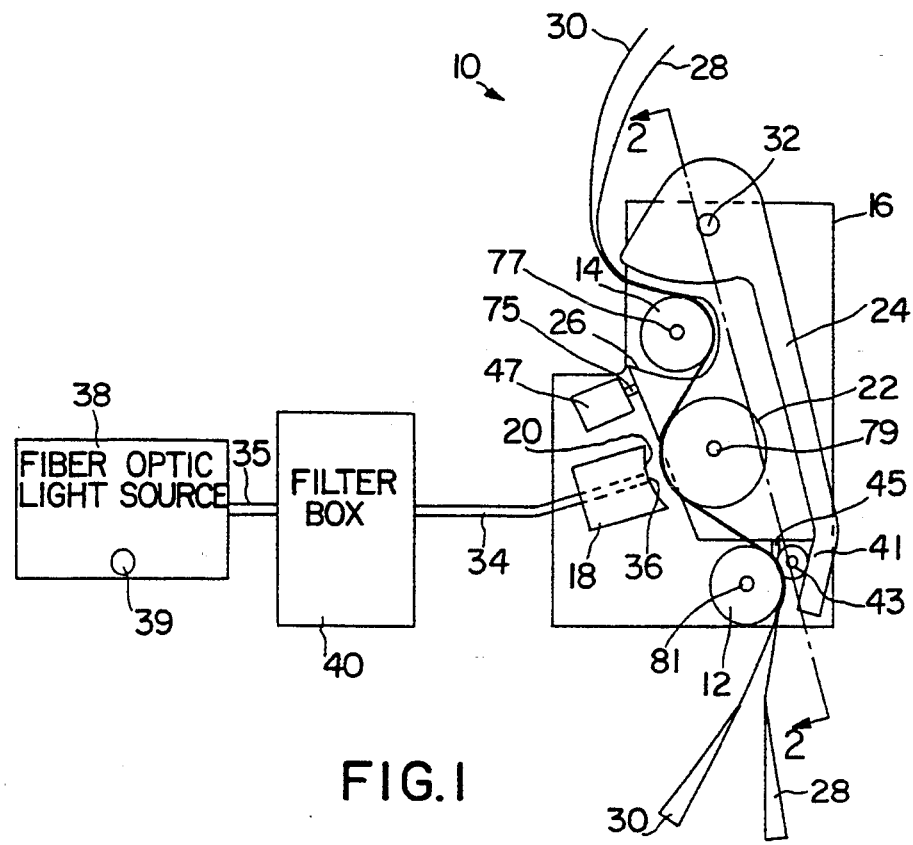
FIG. 1 is a view of the printer module in accordance with the present invention in a closed position.

In accordance with the present invention, a printer module will be described which may be affixed to a standard contact printer for use in a contact printing process. The addition of this printer module enables the formation of a positive print having digital and analog optical soundtracks by using a sound negative having negative digital and analog optical soundtracks. The present invention will now be explained by referring to the following description in conjunction with FIGS. 1-13 wherein like elements are designated by like reference numerals.

Referring to FIG. 1, a printer module 10 in accordance with the present invention is shown. The module 10 includes a pivot arm 24 positioned over a baseplate 16. The baseplate 16 includes first guide roller 12 having a first rotation axis 77 and a second guide roller 14 having a second rotation axis 81. The first 12 and second 14 guide rollers are spaced apart and are rotatably mounted onto the baseplate 16. A main roller 22 having a third rotation axis 79 is positioned between the first 12 and second 14 guide rollers. The main roller 22 is rotatably mounted to the pivot arm 24. The pivot arm 24 further includes cutout portions 26 which provide clearance around the first 12 and second 14 guide rollers. In a preferred embodiment, the first 77, second 81, and third 79 rotation axes are coplanar.

As will be described, the module 10 is at fixed to a contact printer and is positioned in a film path for a sound master such as an exposed and developed sound negative 30 and unexposed film such as print film 28. In FIG. 1, a section of the sound negative 30 and a section of the print film 28 are shown positioned within the module 10. In the module 10, the sound negative 30 is positioned to the left of the print film 28 and directly contacts the print film 28. In addition, the sound negative 30 contacts a right side of the first 12 and second 14 guide rollers. The print film 28 contacts the left side of the main roller 22. The first 12, second 14, and main 22 rollers are positioned to provide tension sufficient maintaining contact between the sound negative 30 and the print film 28. The sound negative 30 and print film 28 are advanced upwardly from the first guide roller 12 to the second guide roller 14 by the contact printer (not show). Consequently, the sound negative 30 and the print film 28 travel a substantially S-shaped path from the first guide roller 12 to the main roller 22. Thereafter, the sound negative 30 and the print film 28 travel a substantially reverse S-shaped path from the main roller 22 to second guide roller 14.

The baseplate 16 further includes a feed-through block 18 having an output surface 20. In a first or closed position, the pivot arm 24 is located such that the main roller 22 positions the sound negative 30 a predetermined distance from the output surface 20. Fiber optic cables 34 (only one is shown for purposes of clarity) extend through the feed-through block 18, one adjacent each edge of the negative 30 as will be seen more clearly in FIGURE 8. The cables 34 each include a light output end 36. Each output end 36 terminates at the output surface 20 of the feed-through block 18. The output surface 20 and each output end 36 have an arcuate shape which mates with the shape of the main roller 22. The cables 34 extend from a filter box 40. The filter box 40 enables the use of at least one light filter (not shown) to provide light suitable in color balance for exposing print film 28. The filter box 40 further includes a splitter (not shown) for splitting the light in order to feed both cables 34. A standard fiber optic light source 38 is connected to the filter box 40 by a main fiber optic cable 35. The light source 38 includes a control knob 39. The knob 39 enables an operator to turn on the light source 38 and vary the intensity of the light generated by the light source 38 as desired.

In use, light from the light source 38 is transmitted by the main cable 35 to the filter box 40. The filter box 40 then splits and filters the light. Light from the filter box 40 is then transmitted through the cables 34 and is subsequently emitted from each output end 36. The light emitted from each output end 36 then impinges on the sound negative 30 to expose the print film 28 and ultimately form a positive print in a well known manner. In a preferred embodiment, two cables 34 are used to provide a digital optical soundtrack on both edges of the positive print as will be described hereinafter.

The pivot arm 24 is rotatably attached to the baseplate 16 by a pivot element 32. As such, the pivot arm 24 and the main roller 22 may be rotated in a counterclockwise direction away from the feed-through block 18 into a second or open position and then rotated clockwise back to the closed position as desired. The baseplate 16 further includes a pivot stop block 47 having an adjustment screw 75. In the closed position, the pivot arm 24 abuts against the adjustment screw 75. The block 47 and adjustment screw 75 serve to stop clockwise rotation of the pivot arm 24 once the pivot arm 24 is in the closed position. In addition, the adjustment screw 75 is moveable into or out of the block 47 to enable accurate positioning of the sound negative 30 with respect to the output surface 20. The module 10 further includes a locking mechanism 41 having a spring loaded locking pin 45 and a roller element 43. The roller element 43 is positioned underneath a portion of the first guide roller 12 and the pivot arm 24 and is rotatably affixed to the baseplate 16. As will be described, the locking mechanism 41 serves to maintain the pivot arm 24 in the closed position.

Figure 2:
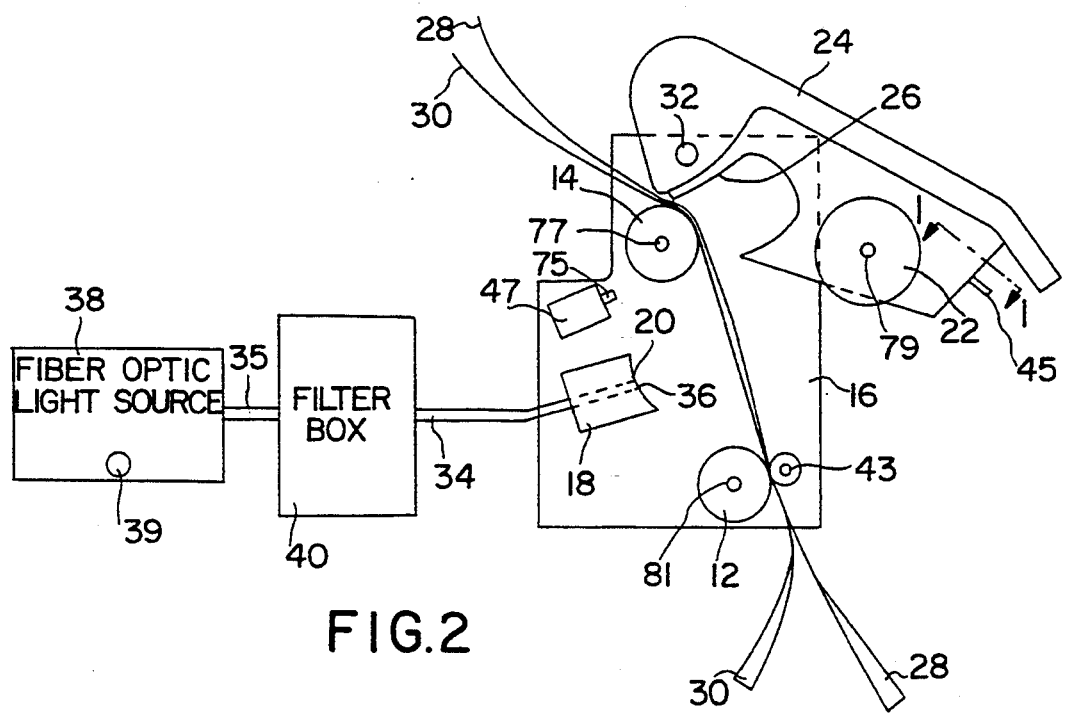
FIG. 2 is a view of the printer module in an open position.

Referring to FIG. 2, the module 10 is shown in the open position. The open position enables the operator to thread the sound negative 30 and print film 28 through the module 10. In use, the operator positions the sound negative 30 between a right side of the first 12 and second 14 guide rollers and the print film 28. The operator then rotates the pivot arm 24 in a clockwise rotation until the pivot arm 24 contacts the adjustment screw 75, thus locating the pivot arm 24 in the closed position. This causes the print film 28 to contact the main roller 22 and the sound negative 30 such that the sound negative 30 is positioned a predetermined distance from the output surface 20 as previously described.

Figure 3:
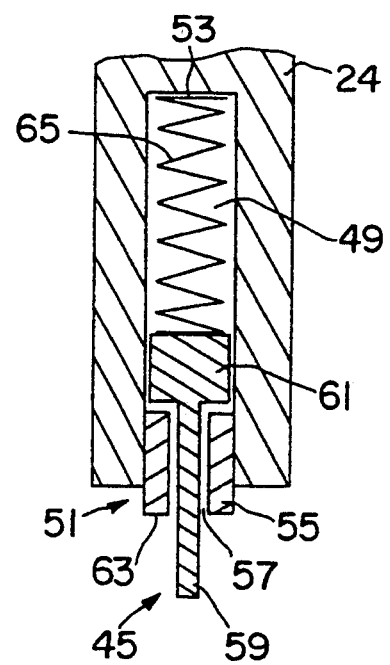
FIG. 3 is a cross sectional view along section line 1—1 of FIG. 2 of a spring loaded pin in an extended position.

Referring to FIG. 3, a cross sectional view of the pivot arm 24 and the pin 45 along section line 1-1 of FIG. 2 is shown. The pivot arm 24 includes a cavity 49 having an open end 51 and a closed end 53. A collar 55 having a bore 57 and a collar end 63 is threadably affixed within the open end 51. The pin 45 includes an elongated portion 59 having a predetermined length and a base portion 61 that is wider than the bore 57. The pin 45 is positioned such that the base portion 61 is located within the cavity 49 and the elongated portion 59 extends through the bore 57. The elongated portion 59 is vertically moveable within the bore 57. In an extended position, the base portion 61 contacts the collar 55. Consequently, the elongated portion 59 is fully extended out of the bore 57 and past the collar end 63. A spring 65 is positioned between the base portion 61 and the closed end 53. The spring 65 serves to urge the base portion 61 against the collar 55 thereby placing the pin 45 in the extended position.

Figure 4:
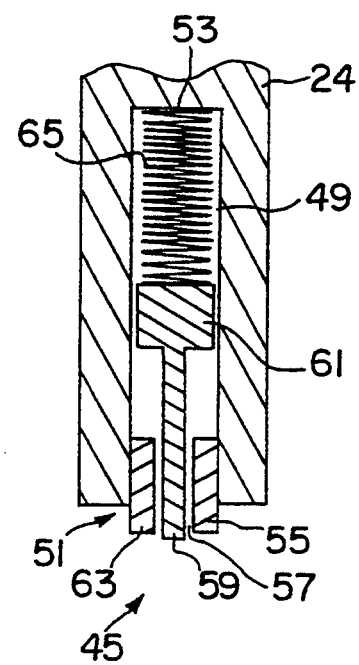
FIG. 4 is a cross sectional view along section line 1—1 of FIG. 2 of the spring loaded pin in a retracted position.

In a retracted position, an upward force is applied to the elongated portion 59 such that the elongated portion 59 is retracted into the bore 57, thereby biasing the pin 45 to move to the extended position. Referring to FIG. 4, the pin 45 is shown in the retracted position. In this position, the spring 65 is compressed, thereby urging the pin 45 to move downward to the extended position. Upon removal of the upward force, the pin 45 is caused to move to the extended position by the spring 65.

Figure 5:
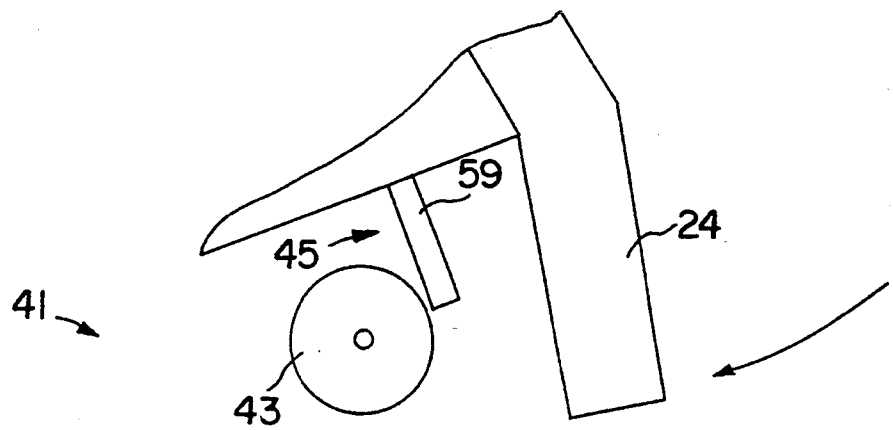
FIG. 5 depicts a portion of a pivot arm in the open position and the spring loaded pin in the extended position.
Figure 6:
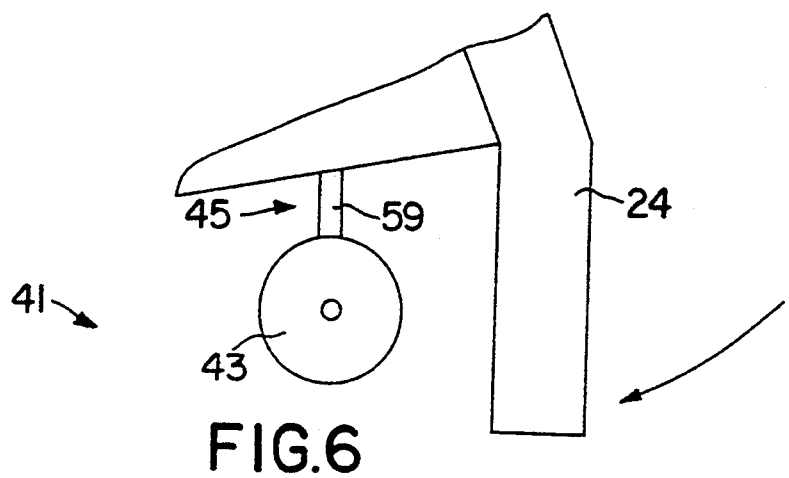
FIG. 6 depicts the spring loaded pin in the retracted position as the pivot arm rotates past a roller element.
Figure 7:
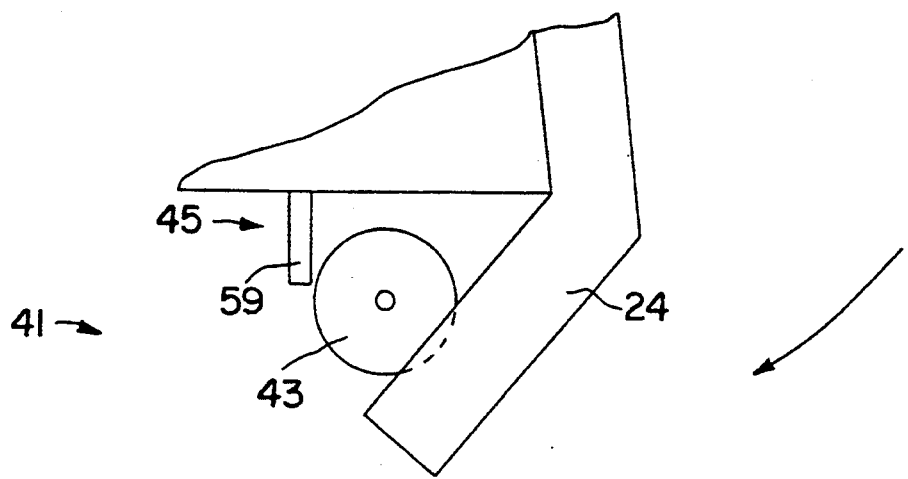
FIG. 7 depicts the pivot arm in the closed position wherein the spring loaded pin is extended on a left side of the roller element.

Referring to FIGS. 5, 6 and 7, the operation of the locking mechanism 41 is shown as the pivot arm is rotated to the closed position (FIG. 1). In FIGS. 5, 6 and 7, a portion of the pivot arm 24 is depicted and the baseplate 16 is not shown for purposes of clarity. In FIG. 5, the pivot arm 24 is shown rotated clockwise from the open position (FIG. 2) at the moment before the pin 45 makes contact with the roller element 43. In FIG. 6, the pivot arm 24 is shown further rotated in a clockwise direction toward the closed position wherein the pin 45 contacts the roller element 43. This exerts an upward force on the elongated portion 59 of the pin 45 thereby retracting the pin 45 into the cavity 49 (FIG. 4) and biasing the pin 45 to move to the extended position. As such, this enables the pivot arm 24 to be rotated clockwise past the roller element 43 until the pivot arm 24 abuts against the adjustment screw 75 (FIG. 1), thus placing the pivot arm 24 in the closed position. Referring to FIG. 7, the pivot arm 24 is shown in the closed position. After the pin 45 moves past the roller element 43, the spring 65 urges the pin 45 back into the extended position. Consequently, the pin 45 is positioned on a left side of the roller element 43. As such, contact between the elongated portion 59 of the pin 45 and the left side of the roller element 43 inhibits counterclockwise rotation of the pivot arm 24. In order to move the pivot arm 24 to the open position, a force is exerted in a clockwise direction on the pivot arm 24 sufficient to overcome the spring 65 bias on the pin 45. This retracts the pin 45 and enables the pivot arm 24 to be moved to the open position. Upon rotating past the roller element 43, the pin returns to the extended position as previously described.

Figure 8:
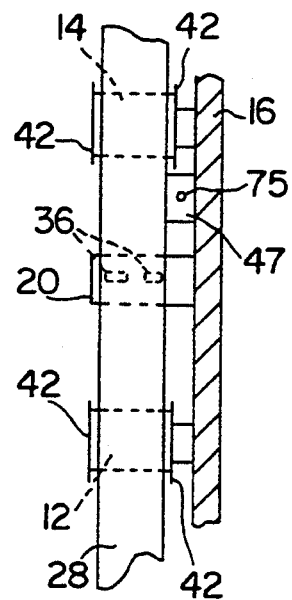
FIG. 8 is a view along section line 2—2 of FIG. 1.

Referring to FIG. 8, a view along section line 2—2 of FIG. 1 is shown. In FIG. 8, the pivot arm 24 and main roller 22 are not shown for purposes of clarity. The first 12 and second 14 guide rollers further include spaced apart end flanges 42. The end flanges 42 define a precise roller width for accommodating the print film 28 and sound negative 30. In use, the sound negative 30 and the print film 28 are positioned between the flanges 42. The flanges 42 serve to accurately position the sound negative 30 and print film 28 relative to each output end 36 of cables 34 as the sound negative 30 and the print film 28 are advanced through the module 10. Hole registration of the print film 28 and the sound negative 30 is maintained by existing printer sprockets. In a preferred embodiment, two cables are utilized which are spaced apart from each other at a predetermined distance in order to expose both edges of the print film 28 as will be described.

Figure 9:
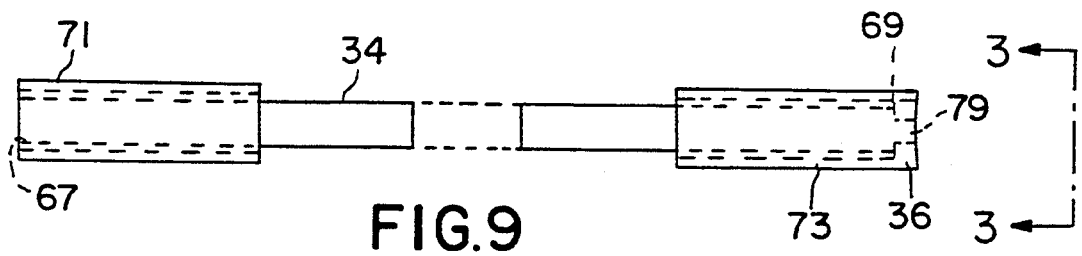
FIG. 9 is a side view of a fiber optic cable having end bushings.
Figure 10:
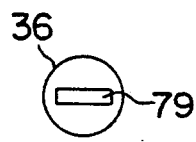
FIG. 10 is an end view of the fiber optic cable along line 3—3 of FIGURE.

Referring to FIG. 9, a configuration for the cables 34 and the output ends 36 is shown (one cable is shown for purposes of clarity). The cable 34 is fabricated in a manner well known in the art and includes first 67 and second 69 ends. The cable 34 further includes first 71 and second 73 end bushings. The first 71 and second 73 end bushings may be fabricated from a suitable opaque material such as metal. The first end bushing 71 has a hollow cylinder configuration and includes a first interior hole extending through the interior of first end bushing 71. The first hole has a constant size and is adapted to fit onto the first end 67. As such, the first end 67 of the cable 34 is open. In addition, the first end bushing 71 is adapted to be secured to the filter box 40. The second end bushing 73 includes a second interior hole adapted to fit onto the second end 69. The second end bushing 73 further includes the output end 36. The output end 36 extends past the second end 69. The output end 36 includes an open slit 79 which is smaller in size than the second hole and which communicates with the second hole. As previously described, the output end 36 has an arcuate shape which mates with the main roller 22. FIG. 10 is a view along line 3—3 of FIG. 9 and shows an end view of the output end 36. In a preferred embodiment, the slit 79 has a rectangular shape in order to more accurately direct light impinging on the sound negative, although other shapes may be used. By way of example, the slit 79 may be approximately 0.062 inches wide and 0.177 inches long.

Figure 11:
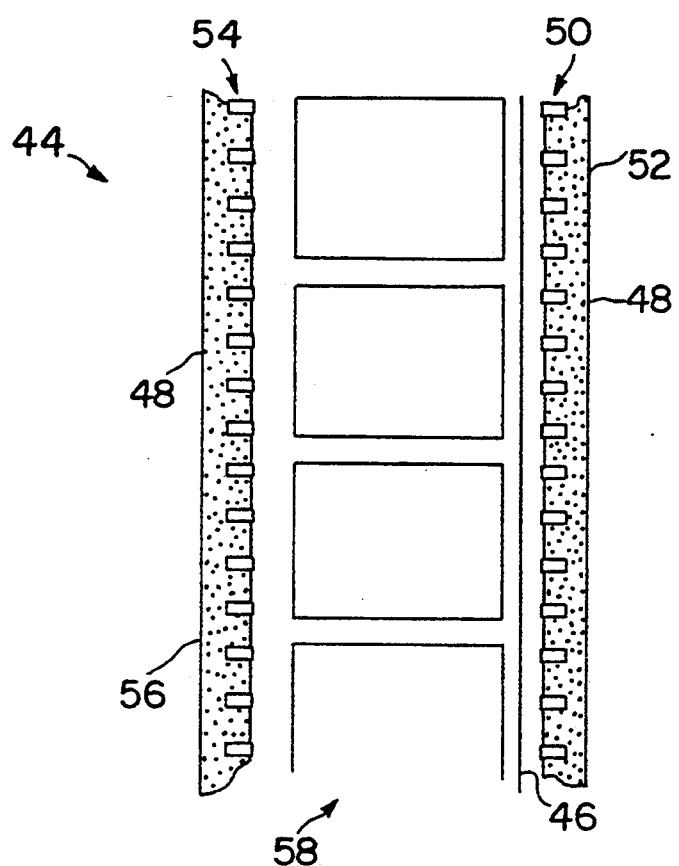
FIG. 11 depicts a motion picture filmstrip having an analog and digital soundtrack.

Referring to FIG. 11, a 35 mm motion picture positive print 44 having an analog optical soundtrack 46 and a digital optical soundtrack 48 in accordance with the present invention is shown. The positive print 10 may have a standard configuration as specified in ANSI standard PH22.111, although other configurations may be used. The positive print 10 includes a righthand column of sprocket holes 50 and a right edge 52 and a lefthand column of sprocket holes 54 and a left edge 56. In addition, a plurality of vertically arranged picture frames 58 are positioned between the lefthand 54 and righthand 50 columns of sprocket holes. The analog soundtrack 46, which may be a variable area soundtrack, is formed in a portion of the area between the righthand sprocket holes 50 and the picture frames 58. As such, the configuration of the positive print 44 conforms to generally accepted standards in the industry and is compatible with movie theaters having analog sound reproduction systems.

The digital soundtrack 48 is formed in sublayers of the positive print 44 and is formed in an area between each of the righthand 50 sprocket holes. The digital soundtrack 48 is also formed in an area between each of the lefthand 54 sprocket holes. In addition, the digital soundtrack 48 extends from the right edge 48 to the righthand sprocket holes 50 and the left edge 48 to the lefthand sprocket holes 54. It is understood that other configurations for the digital soundtrack 48 may be obtained by changing the placement of the cables 34 (FIG. 2).

Figure 12:
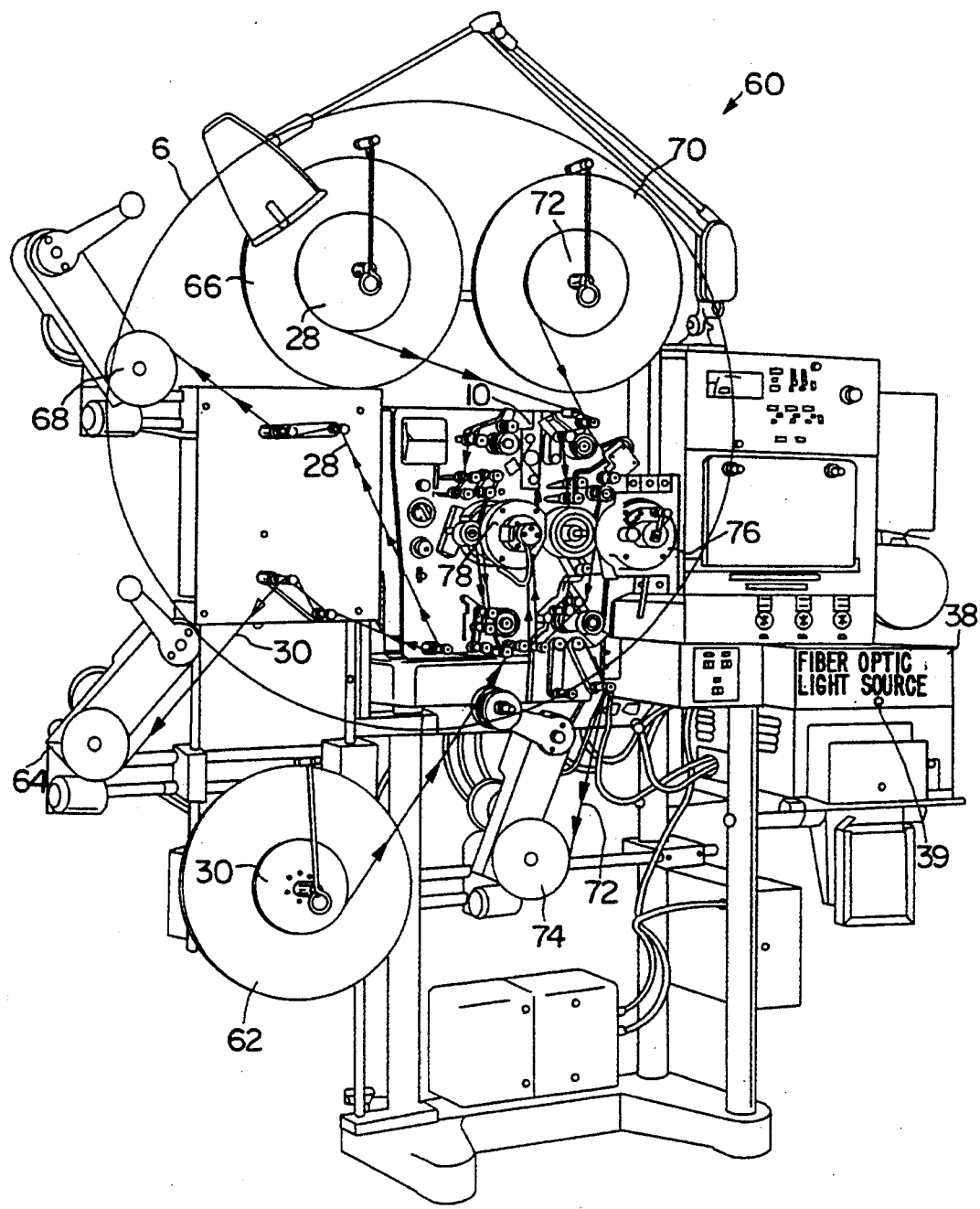
FIG. 12 depicts the printer module affixed to a contact printer.
Figure 13:
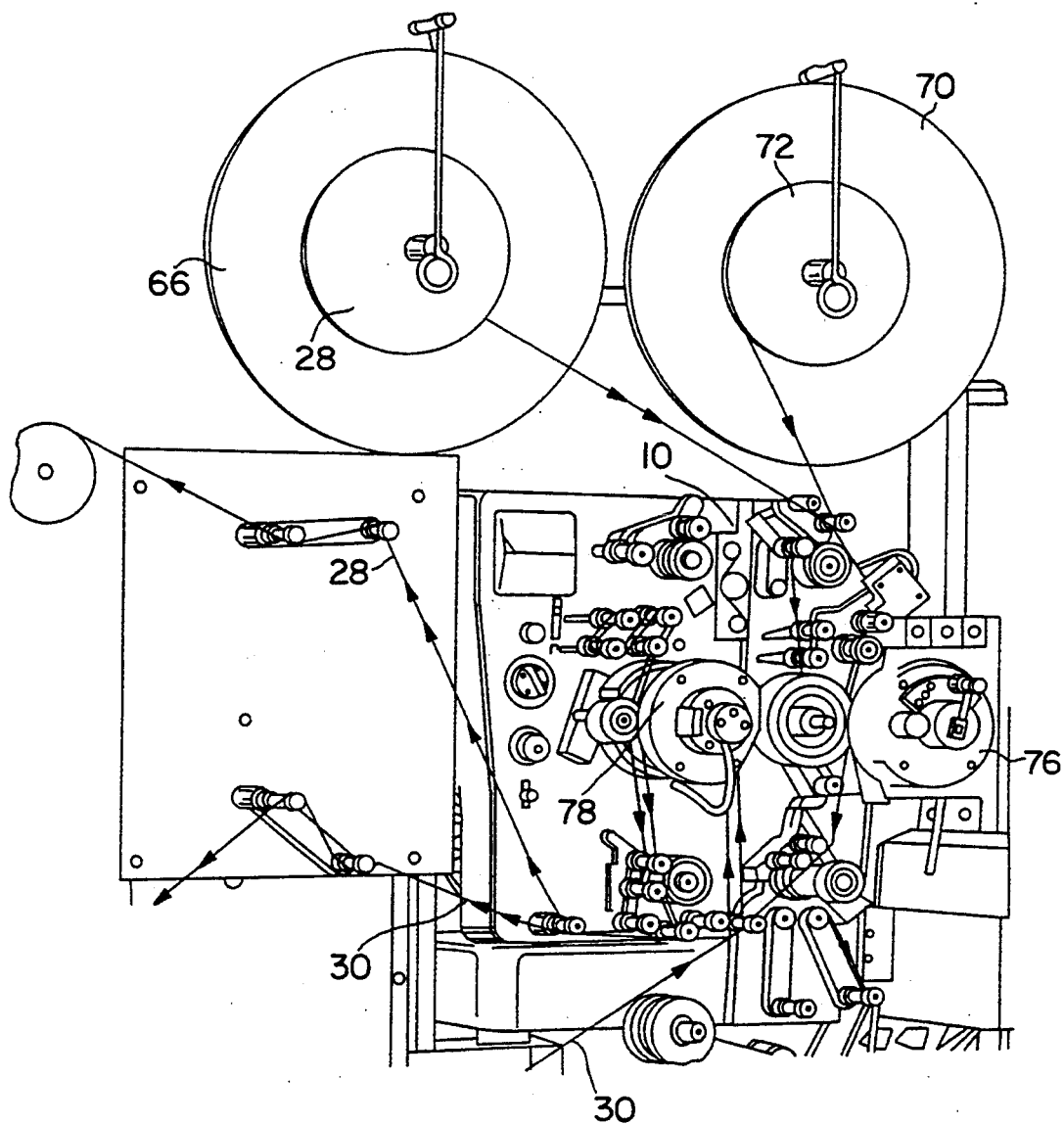
FIG. 13 is an enlarged view of a section of the contact printer depicting the location of the printer module.

The present invention may be used in conjunction with commercially available contact printers used to manufacture motion pictures. One such printer is a contact printer manufactured by Bell and Howell designated as Model C. Referring to FIG. 11, the module 10 is shown affixed to a top portion of a Bell and Howell Model C printer 60. In FIG. 12, balloon section 12 is shown as an enlarged view in FIG. 13 for purposes of clarity. Referring to FIG. 12 in conjunction with FIG. 13, the light source 38 is affixed to a lower portion of the printer 60 and is coupled to a power supply (not shown). In accordance with the present invention, the operation of the printer 60 and the contact printing process are not substantially changed by the addition of the module 10.

Printer 60 includes a first supply reel 62 for supplying the sound negative 30 and a first motorized take-up reel 64 for collecting the sound negative 30. The printer 60 further includes a second supply reel 66 for supplying the print film 28 and a second motorized take up-reel 68 for collecting the print film 28. In addition, the printer 60 includes a third supply reel 70 for supplying a picture negative 72 and a third motorized take-up reel 74 for collecting the picture negative 72. In addition, the printer 60 includes drive sprockets which coact with the lefthand 54 and righthand 50 sprocket holes (FIG. 11) to advance the sound negative 30, print film 28 and picture negative 72 from the supply reels 62, 66, 70 to the take up reels 64, 68, 70. In FIGS. 11 and 12, the direction of travel of the sound negative 30, print film 28 and picture negative 72 is indicated by arrows.

The print film 28 and picture negative 72 are advanced to a first set rollers which place the print film 28 and picture negative 72 in contact with each other. The first set of rollers guide the print film 28 and the picture negative 72 to a picture head 76. The picture head 76 serves to expose the print film 28 to form a positive print from the picture negative 72. The picture negative 72 is then separated from the print film 28 by a second set of rollers and collected by the third take-up reel 74.

The sound negative 30 and print film 28 are advanced to a third set of rollers which place the sound negative 30 and print film 28 in contact with each other. The sound negative 30 and the print film 28 are then advanced through the module 10 as previously described. The print film 28 is then exposed by light from the light source 38 to form a positive print from the digital soundtrack on the sound negative 30. The sound negative 30 and print film 28 are then advanced through a fourth set of rollers to an analog sound head 78. The analog sound head 78 serves to expose the print film 28 to form a positive print from the analog soundtrack on the sound negative 30. The sound negative 30 is then separated from the print film 28 by a fourth set of rollers and is collected by the first take-up reel 64. Similarly, the print film 28 is advanced through a fifth set of rollers and is collected by the second take-up reel 68. As such, the module 10 is positioned before the analog sound head 78 in the sound negative 30 film path and after the picture head 76 in the print film 28 film path.

It is understood that many variations of the present invention are possible. For example, the present invention may be used to form a positive digital optical soundtrack directly onto the print film 28 without using a sound negative. Although the present invention is described in terms of a negative photographic process, an analogous positive process could also be used. Also, although first 12 and second 14 guide rollers having end flanges 42 are preferred, conventional sprockets could be substituted without departing from the invention. Furthermore, in an alternate embodiment, the configuration of the first 12, second 14 guide rollers and the main roller 22 are be reversed. In this embodiment, the first 12 and second 14 guide rollers are rotatably mounted to the pivot arm and the main roller 22 is rotatably mounted to the baseplate 16.

Thus it is apparent that in accordance with the present invention, a module that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A module for a contact printer used to manufacture a motion picture, wherein a sound negative having a negative digital soundtrack is placed in contact with motion picture film, comprising:
   a baseplate affixed to said contact printer;
   first and second guide rollers rotatably mounted to said baseplate;
   a pivot arm rotatably mounted to said baseplate;
   a main roller located in a first position between said first and second guide rollers and rotatably mounted to said pivot arm, wherein when said main roller is in said first position said film contacts said main roller and said sound negative contacts each of said first and second guide rollers and wherein rotation of said pivot arm moves said main roller away from said first and second guide rollers into a loading position to enable installation of said film and said sound negative between said main roller and said first and second guide rollers; and light means for providing light for exposing said film positioned adjacent said sound negative, wherein said light impinges on said sound negative and transmits therethrough thereby forming a positive digital optical soundtrack on said film.

2. The module according to claim 1, wherein said light means is located a predetermined distance from said sound negative.

3. The module according to claim 1, wherein said light means is a fiber optic light source.

4. The module according to claim 3, further including at-least one fiber optic cable extending from said fiber optic light source, wherein said cable includes an output aperture having a rectangular configuration.

5. The module according to claim 4, wherein said output aperture is approximately 0.062 wide and 0.177 inches long.

6. The module according to claim 4, further including a filter box affixed between said fiber optic light source and said output aperture for filtering light generated by said fiber optic light source to provide light suitable for exposing said film.

7. The module according to claim 1, further including locking means for inhibiting rotation of said pivot arm to maintain said main roller substantially between said first and second guide rollers.

8. The module according to claim 7, wherein said locking means includes a spring loaded pin extending downward from said from pivot arm, said pin moveable between an extended position wherein said pin extends out of said pivot arm and a retracted position wherein said pin retracts within said pivot arm and is biased to move to said extended position, said locking means further including a roller member rotatably affixed to said baseplate adjacent said first guide roller wherein when said pivot arm rotates relative to said baseplate, said pin contacts said roller element and retracts within said pivot arm, and when said pivot arm continues to rotate past said roller element said pin moves to said extended position, thereby contacting a side of said roller element and inhibiting rotation of said pivot arm.

9. The module according to claim 1, wherein said first and second guide rollers each include end flanges to prevent side to side misregistration of said sound master and said film.

10. A module for a contact printer used to manufacture a motion picture, wherein a sound negative having a negative digital soundtrack is placed in contact with motion picture film, comprising:

a baseplate affixed to said contact printer;

a first guide roller rotatably mounted to said baseplate, wherein said first guide roller includes a first rotation axis and said sound negative contacts a left side of said first guide roller;

a second guide roller rotatably mounted to said baseplate, wherein said second guide roller includes a second rotation axis and said sound negative contacts a left side of said second guide roller, said first and second guide rollers further including end flanges to prevent side to side misregistration of said sound master and said film;

a pivot arm rotatably mounted to said baseplate, said pivot arm including a spring loaded pin extending downward from said pivot arm, said pin moveable between an extended position wherein said pin extends out of said pivot arm and a retracted position wherein said pin retracts within said pivot arm and is biased to move to said extended position;

a main roller positioned between said first and second guide rollers and rotatably mounted to said pivot arm, wherein said main roller includes a third rotation axis and said film contacts a right side of said main roller, and said first, second and third rotation axes are coplanar whereby said sound negative and said film are configured in a substantially S-shaped path between said first guide roller and said main roller and in a substantially reverse S-shaped path between said main roller and said second guide roller;

a roller member rotatably affixed to said baseplate adjacent said first guide roller wherein when said pivot arm rotates relative to said baseplate, said pin contacts said roller element and retracts within said pivot arm, and when said pivot arm continues to rotate past said roller element said pin moves to said extended position, thereby contacting a side of said roller element and inhibiting rotation of said pivot arm;

at least one fiber optic cable having an output end positioned adjacent said sound negative and opposite said main roller, said cable connected to a fiber optic light source, wherein light generated by said light source is transmitted by said cable and emitted from said output end wherein said light impinges on said sound negative thereby forming a positive digital optical soundtrack on said film.

11. The module according to claim 10, wherein said cable further includes an opaque bushing secured to said output end, said bushing having a rectangular aperture for emitting said light.

12. The module according to claim 11, wherein said rectangular aperture is approximately 0.062 inches wide and 0.177 inches long.

13. The module according to claim 12 wherein said rectangular aperture is positioned a predetermined distance from said sound negative.

14. The module according to claim 13, further including a filter box affixed to said cable between said light source and said output end for filtering light generated by said light source to provide light suitable in color balance for exposing said film.

15. The module according to claim 14, wherein said filter box includes a splitter for splitting said light generated by said light source.

* * * * *